(12) United States Patent
Ecclesine (10) Patent No.: US 8,064,411 B2
(45) Date of Patent: Nov. 22, 2011

(54) SPECULATIVE POWER SAVE

(75) Inventor: Peter W. Ecclesine, Gilroy, CA (US)

(73) Assignee: Cisco Technology, Inc., San Jose, CA (US)

( * ) Notice: Subject to any disclaimer, the term of this patent is extended or adjusted under 35 U.S.C. 154(b) by 1160 days.

(21) Appl. No.: 11/669,808

(22) Filed: Jan. 31, 2007

(65) Prior Publication Data

US 2008/0181156 A1    Jul. 31, 2008

(51) Int. Cl.
*H04B 7/212* (2006.01)

(52) U.S. Cl. ........ 370/337; 370/311; 370/338; 370/328; 370/318; 370/458; 455/503; 455/556.1; 455/412; 455/425.2; 455/574; 455/343.4; 713/330; 713/320

(58) Field of Classification Search ............... 455/426.2, 455/574, 343.4, 41.2, 556.1, 503; 370/311, 370/338, 328, 318, 458; 713/330, 320
See application file for complete search history.

(56) References Cited

U.S. PATENT DOCUMENTS

| | | | |
|---|---|---|---|
| 5,740,366 A | 4/1998 | Mahany et al. | |
| 5,764,895 A | 6/1998 | Chung | |
| 6,374,311 B1 | 4/2002 | Mahany et al. | |
| 6,895,450 B2 | 5/2005 | Mahany et al. | |
| 7,613,139 B1 * | 11/2009 | Wang et al. | 370/311 |
| 2003/0227882 A1 * | 12/2003 | Czaja et al. | 370/329 |
| 2005/0025080 A1 * | 2/2005 | Liu | 370/311 |
| 2005/0136914 A1 * | 6/2005 | van Kampen et al. | 455/426.2 |
| 2005/0157715 A1 * | 7/2005 | Hiddink et al. | 370/389 |
| 2006/0252443 A1 * | 11/2006 | Sammour et al. | 455/518 |
| 2007/0239463 A1 * | 10/2007 | Miyasaka et al. | 704/500 |
| 2008/0102845 A1 * | 5/2008 | Zhao | 455/450 |

* cited by examiner

*Primary Examiner* — Kwasi Karikari (74) *Attorney, Agent, or Firm* — Tucker Ellis & West LLP (57) ABSTRACT

In an example embodiment, a method for speculative power saving. The beginning portion of a header (e.g. a physical layer convergence protocol "PLCP" header of a beacon) is processed to determine whether a predefined bit is set that indicates whether the frame contains any delivery traffic indication for buffered multicast and/or unicast frames. If the bit is set, indicating the frame contains no delivery traffic indication of buffered frames, receiving and processing of the frame stops (e.g. the remainder of the PPDU is not processed) and the receiver switches to a power save state. In an example embodiment, if a predefined NULL beacon frame is detected, receiving and processing of the frame (and PPDU) stops and the receiver switches to a power save state.

19 Claims, 4 Drawing Sheets

SPECULATIVE POWER SAVE

BACKGROUND

A multicast packet includes a group address that delivers the same packet to more than one destination. If the destination address refers to all nodes on the network, then the packet is referred to as a broadcast packet.

The use of multicast and broadcast packets conserves the bandwidth of a network because only the transmission of a single packet is necessary rather than sending packets individually addressed to each node. This is valuable for wireless networks having limited throughput available.

If a large group of wireless clients, for example, need to receive a particular video stream, then sending multicast packets really pays off. The use of unicast packets to send the stream to each recipient individually would require many separate video streams, resulting in major performance impacts to the wireless network because of the huge amount of bandwidth that would be consumed by the separate streams. With multicast packets, only one stream is necessary.

The use of multicast packets can also facilitate power saving for wireless clients. For example, in an Institute of Electrical and Electronic Engineers (IEEE) 802.11 network, an access point (AP) buffers all multicast frames and sends them immediately following the next DTIM (delivery traffic indication message) if any one client associated with the access point enables power saving mode. With power-save enabled, a client radio will wake up each DTIM beacon and stay awake long enough to receive all of the multicast traffic (occurring after the DTIM beacon).

However, not every DTIM beacon has multicast or broadcast traffic. A zero traffic beacon indication (which can be referred to as "a zero TIM" or "Null Beacon") is a TIM where the DTIM is zero, indicating that there are no buffered broadcast or, multicast frames, additionally there are no buffered unicast frames and no frame elements requiring action in the regulatory domain (e.g. no DFS Channel Switch Announcement). For devices operating 24/7 (24 hours a day/7 days a week) there may be substantial amount of time (e.g. 60 hours during the week) that the wireless client is not busy transmitting, but still needs to receive beacon frames from an access point. Receiving and processing zero TIM beacon frames can consume substantial amounts of power in such circumstances. Some devices consume eighteen times as much power in receiving as they do when idle [See e.g. SDC-CF10G 802.11g Compact Flash Module with Antenna Connectors available from Summit Data Communications, Inc., 526 South Main Street, Suite 805, Akron, Ohio—http://www.summitdatacom.com/specifications.htm#SDC-PC2CF_PCMCIA_Adapter_for_Compact_Flash_Modules_with_ Antenna_Connector s_].

Overview of Example Embodiments

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an example embodiment, there is disclosed herein a method comprising receiving the beginning of a signal, processing a header at the beginning of the signal and determining whether a bit in the header is set indicating there are no DTIM indications contained within the frame. Receiving and processing of the frame ceases and switching to a power save state occur responsive to determining the bit is set.

In an example embodiment, there is disclosed herein a method comprising receiving the beginning of a frame, determining whether the frame contains a predefined null beacon frame and switching to a power save state responsive to determining the frame contains the predefined null beacon frame.

In an example embodiment, there is disclosed herein an apparatus comprising a wireless transceiver, a processor coupled to the wireless transceiver and operable to process a frame received by the wireless transceiver, and power save logic coupled to the processor. The processor is operable to process a PLCP header of the frame received by the wireless transceiver to determine whether a predefined bit in the header is set indicating there are no delivery traffic indications of multicast frames (and/or unicast frames and/or frame elements requiring action in the regulatory domain) contained within the frame and the processor is responsive to halt receiving and processing the frame and to signal the power save logic to switch to a power save state responsive to determining the predefined bit is set.

In an example embodiment, there is described herein an apparatus comprising a wireless transceiver, a processor coupled to the wireless transceiver and operable to process a frame received by the wireless transceiver and power save logic coupled to the processor. The processor is operable to process the frame to determine whether the frame contains a predefined null beacon frame and the processor is operable to signal the power save logic to switch to a power save state responsive to determining the frame contains the predefined null beacon frame.

Still other objects of the present invention will become readily apparent to those skilled in this art from the following description wherein there is shown and described a preferred embodiment of this invention, simply by way of illustration of at least one of the best modes best suited to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate examples of the present invention, and together with the description serve to explain the principles of the invention.

DESCRIPTION OF EXAMPLE EMBODIMENTS

This description provides examples not intended to limit the scope of the invention, as claimed. The figures generally indicate the features of the examples, where it is understood and appreciated that like reference numerals are used to refer to like elements.

Figure 1:
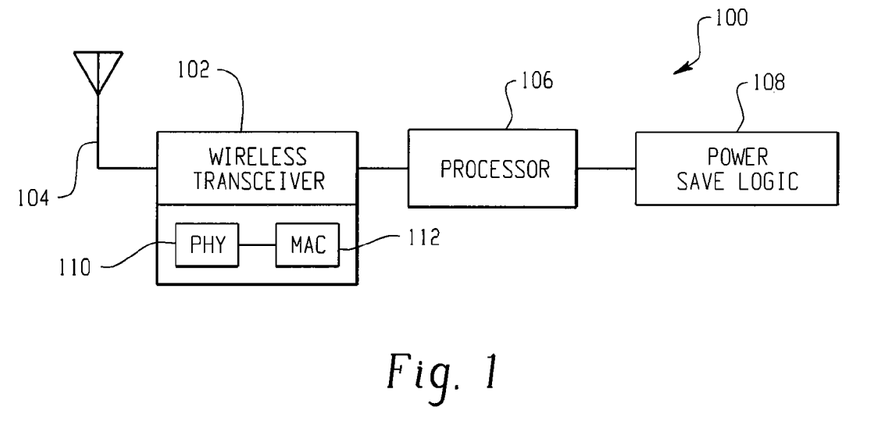
FIG. 1 illustrates an example of an apparatus of an example embodiment.

FIG. 1 illustrates an example of an apparatus 100 of an example embodiment. Apparatus 100 comprises a wireless transceiver 102 operable for sending and receiving wireless signals. Wireless transceiver 102 comprises an antenna 104. A filter can be employed to filter signals to/from antenna 104. In an example embodiment, wireless transceiver 102 comprises a bandpass filter. An amplifier, which can be a low noise amplifier, can be employed to amplify signals to/from the filter. A wireless frequency (e.g. Radio Frequency) to Baseband (RF/BB) converter can be employed to convert RF signals to/from the amplifier and a physical layer processor (PHY). The RF/BB converter may suitably comprise additional Intermediate Frequency Stages (e.g., RF/IF and IF/BB). In an example embodiment, a PHY 110 is coupled to a digital to analog (D/A) and/or an analog to digital (A/D) converter. A Media Access Controller (MAC) processor 112 is coupled to PHY 110. A Read Only Memory (ROM) and Random Access Memory (RAM) can be associated with the MAC 112. Wireless transceiver 102 may further comprise additional filters (not shown) e.g. bandpass and/or baseband filters and amplifiers (Not shown), e.g. a Low Noise Amplifier (LNA) or Power Amplifier (PA) as desired; however, these additional filters are not necessary for understanding aspects of the present invention.

In an example embodiment, PHY 110 is a physical layer processing device (e.g., a modem or digital signal processor). PHY 110 performs digital signal processing, such as analog-to-digital and digital-to-analog conversion, and encoding/decoding of waveforms (modulation/demodulation). The digital signal processing can be done with general purpose digital signal processing integrated circuits, or in specially designed digital logic. In either case, PHY 110 is modulating/demodulating data to be compatible with the appropriate communication standard. For example, in IEEE 802.11a this involves OFDM, while in IEEE 802.11b it involves Direct Sequence Spread Spectrum (DSSS). On one side of PHY 110, data is exchanged with MAC 112, while on the other side of PHY 110, it is exchanged with RF/BB circuit. PHY 110 can include analog-to-digital (A/D) converters for data received from a RF/BB circuit, and digital-to-analog (D/A) converters for data transmitted to a RF/BB circuit.

MAC 112 is a Medium Access Control (MAC) processing system, In an example embodiment, the MAC processing system includes a MAC processor (e.g., an embedded processor) which is a multi-functional processor engine responsible for a variety of different processing tasks associated with the wireless communications. MAC 112 can include RAM to store data going to and from PHY 110. MAC 112 can act upon the data, for example, by encrypting or decrypting it, or by interpreting the data and making decisions as to how and when to forward it.

Processor 106 is coupled to wireless transceiver 102. Processor 106 processes signals that are sent and/or received by wireless transceiver 102. In an example embodiment, processor 106 is coupled to PHY 110. In another example embodiment, processor 106 is coupled to MAC 112. In still another example embodiment, multiple processors are used (e.g. a processor is coupled to PHY 110, a processor is coupled to MAC 112 and a host processor may also be employed).

Power save logic 108 is coupled to processor 106. In an example embodiment, power save logic 108 is responsive to processor 106 to transition apparatus 100 between power save states. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

In an example embodiment, wireless transceiver 102 receives a signal from antenna 104. Processor 106 processing a header for the signal and determines whether a bit in the header is set indicating there are no delivery traffic indications contained within the frame. If the bit is set, processor 106 does not receive or process the remainder of the frame and signals power save logic 108 to switch to a power save (e.g. a low or lower power) state.

Figure 2:
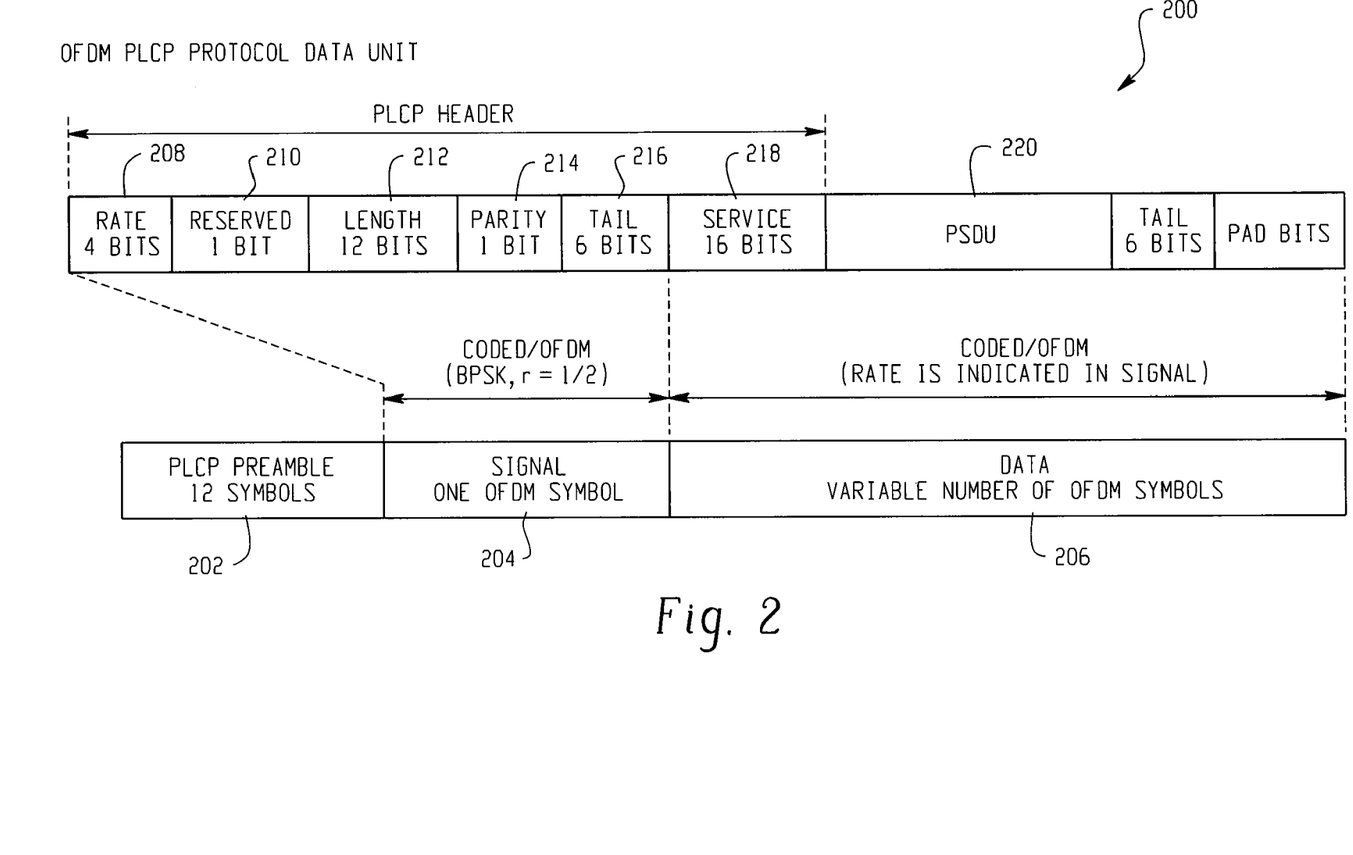
FIG. 2 illustrates an example of an OFDM PLCP Protocol Data Unit suitable adapted for an example embodiment.

For example, wireless transceiver 102 can be suitably adapted to receive an Orthogonal Frequency Division Multiplexing (OFDM) Physical Layer Convergence Protocol (PLCP) Protocol Data Unit (e.g. a PLCP PDU or PPDU) 200 as illustrated in FIG. 2. PPDU 200 comprises a PLCP (Physical Layer Convergence Procedure) preamble 202, a PLCP header 204 and data 206 which may comprise a variable number of OFDM symbols.

In an example embodiment, processor 106 processes the rate 208, reserved 210 bit fields. If the reserved bit 210 is set, indicating to processor 106 that PPDU 200 contains no delivery traffic indications of buffered broadcast, multicast or unicast frames and that there are no frame elements requiring action in the regulatory domain (e.g. no DFS Channel Switch Announcement), processor 106 can stop receiving and processing frame 200 and signal power save logic 108 to switch to a power save state (e.g. processor 106 speculates it can switch to a power save state without receiving and processing the entire frame 200). Optionally, processor 106 can check frame quality factors, such as Received Signal Strength Intensity (RSSI), Bit Error Rate (BER) and/or Packet Error Rate (PER) in deciding whether to switch apparatus 100 to a power save state without receiving and processing the entire frame 200.

In an example embodiment, processor 106 processes the entire PLCP header 204 comprising rate 208, reserved bit 210, length 212, parity 214, tail 216 and service 218 fields of PLCP header 204. If reserved bit 210 is set, and the parity bit 214 is correct, then processor 106 stops receiving and processing frame 200 and signals power save logic 108 to switch to a power save state. Optionally, processor 106 can check frame quality factors, such as Received Signal Strength Intensity (RSSI), Bit Error Rate (BER) and/or Packet Error Rate (PER) in deciding whether to switch apparatus 100 to a power save state without receiving and processing the entire frame 200.

Figure 3:
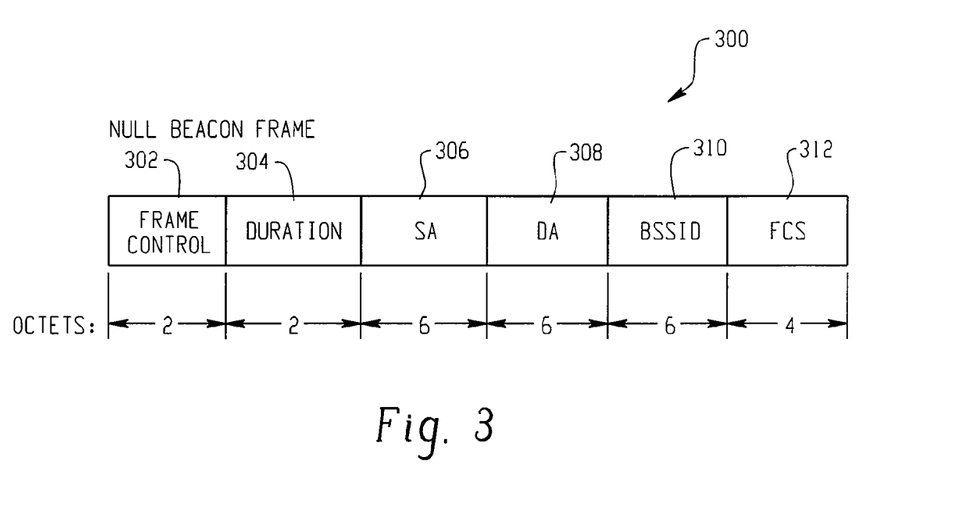
FIG. 3 illustrates an example of a NULL Beacon Frame in accordance with an example embodiment.

In an example embodiment, processor 106 processes the entire PLCP header 204 comprising rate 208, reserved bit 210, length 212, parity 214, tail 216 and service 218 fields of PLCP header 204; and processor 106 processes a frame control field, duration field and an address field of a frame within PPDU 200 (e.g. a frame within the Physical Service Data Unit "PSDU" 220, see e.g. FIG. 3). If processor 106 determines the reserved bit 210 is set, the frame control fields contains data indicating the frame is a beacon frame and the address is directed to an appropriate multicast group, processor 106 stops receiving and processing the frame (and PPDU) and signals power save logic 108 to switch to a power save state. Optionally, processor 106 can check frame quality factors, such as Received Signal Strength Intensity (RSSI), Bit Error Rate (BER) and/or Packet Error Rate (PER) in deciding whether to switch apparatus 100 to a power save state without receiving and processing the entire frame or PPDU 200. In an example embodiment, processor 106 determines whether the frame control field contains a predefined special (or reserved) value, such as for example 0x1110 or 0x1111. In an example embodiment, processor 106 stops receiving and processing frame 200 and signals power save logic 108 to switch to a power save state responsive to determining that reserved bit 210 is set and determining that frame 200 is a beacon frame. Optionally, processor 106 may determine whether frame 200 is a beacon frame that comprises a traffic indication map, and stop receiving and processing frame 200 and signal power save logic 108 to switch to a power save state upon determining that the traffic indication map is set to zero.

In an example embodiment, processor 106 processes PLCP header 204, frame control, source address, destination address fields (see e.g. FIG. 3). Processor 106 verifies the source address and destination address are appropriate (e.g. determines whether the source address is for an associated access point "AP" and that the destination address is for a broadcast/multicast group that apparatus 100 is a member). Upon verifying that the source and/or destination address are appropriate, and the PLCP header indicates a null or zero beacon frame, processor 106 stops processing the frame and/or PPDU 200 and signals power save logic 108 to switch to a power save state.

Figure 4:
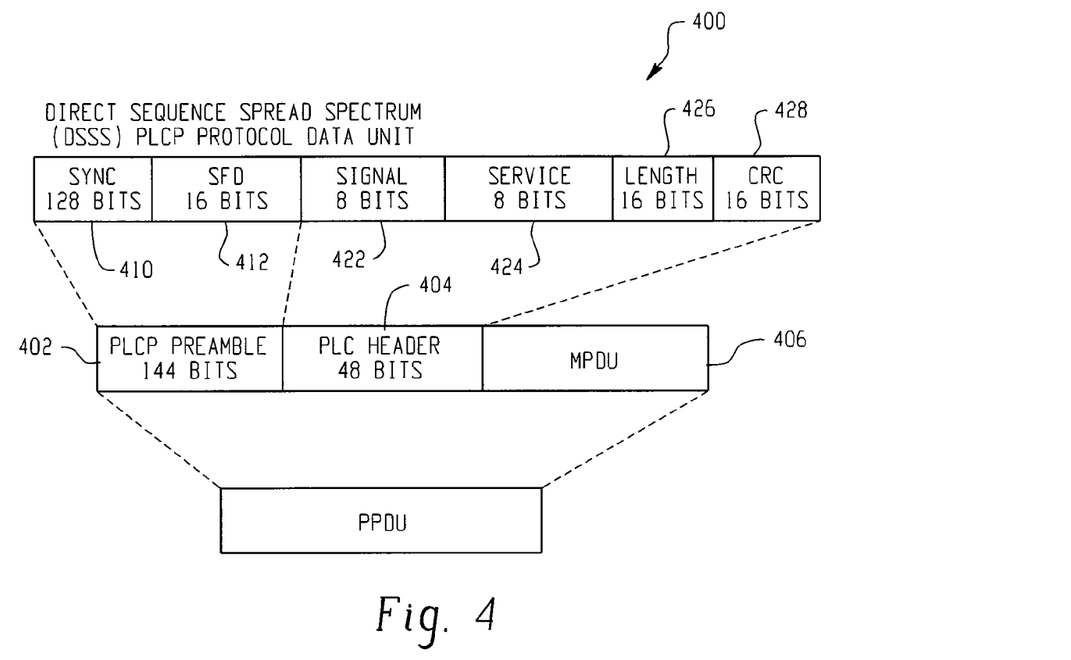
FIG. 4 illustrates an example of a DSSS PLCP Protocol Data Unit in accordance with an example embodiment.

Processor 106 may also be suitably configured to process other types of frames. For example, FIG. 4 illustrates a Direct Sequence Spread Spectrum (DSSS) PPDU 400. DSSS PPDU 400 comprises a PLCP preamble 402 used for synchronizing the receiver, PLCP header 404, and MPDU (MAC Protocol Data Unit) 406 which may contain one or more aggregate frames. PLCP preamble 402 comprises SYNC bits (128 bits in this example) 410 and Start Frame Delimiter Bits (16 bits in this example 412). PLCP header 404 comprises a Signal Field 422, Service Field 424, Length field 426 and a Cyclic Redundancy Check[sum] "CRC" 428. In an 802.11 compatible embodiment, signal field 422 comprises a rate indication and reserved bits. In an example embodiment, a special value can be inserted in one or more of the reserved bits in signal field 422 to indicate there are no delivery traffic indications of multicast frames or other frames a power save station needs to process. Processor 106 responsive to detecting the special value can stop receiving and processing PPDU 400 and signal power save logic 106 to switch to a power save state. In another example embodiment, processor 106 may further process the frame to verify the PLCP preamble CRC is valid. In yet another example embodiment, a portion of a frame within MPDU 406 can be processed by processor 106 to determine whether the frame control field indicates the frame is a beacon frame. Optionally, processor 106 can check frame quality factors, such as Received Signal Strength Intensity (RSSI), Bit Error Rate (BER) and/or Packet Error Rate (PER) in deciding whether to switch apparatus 100 to a power save state without receiving and processing the entire frame 400.

In an example embodiment, processor 106 processes the beginning octets of a frame within a PPDU (e.g. PPDU 200 or PPDU 400) received by wireless transceiver 102 to determine whether the frame contains a predefined null beacon frame (see e.g. FIG. 3). In this embodiment, processor 106 can be coupled to MAC 112. If processor 106 detects a null beacon frame, processor 106 stops receiving and processing the frame and signals power save logic 108 to switch to a power save state.

For example, as illustrated in FIG. 3, a Null Beacon Frame 300 can be defined that comprises frame control field 302, a duration field 304, a source address field 306, a destination address field 308, a basic service set identification (BSSID) field 310 and a frame check sequence (FCS) field 312. In an example embodiment, processor 106 can stop receiving and processing and switch apparatus 100 to a power save state responsive to determining the frame control 302 contains a predefined value that indicates a null beacon frame. In another example embodiment, processor 106 processes the entire frame 300 and determines that frame control 302 contains a predefined value that indicates a null beacon frame and verifies the FCS 312 is correct. In an example embodiment, the frame control field 302 is two octets in size, the duration field 304 is two octets in size, the source address field 306 is six octets in size, the destination address field 308 is six octets in size, the basic service set identifier field 310 is six octets and the frame check sequence field 312 is four octets in size.

An aspect of the example embodiments described herein is that apparatus 100 can enter a power save state before the entire frame and/or PPDU is received and processed. This can result in a reduction in the amount of time apparatus 100 has to remain in a powered (e.g. high powered or receiving) state. For example, is referring to frame 200 of FIG. 2, processor 106 can process the PLCP header and 22 octets of a general frame before deciding whether to switch to a power save state. These 22 octets include the frame control (2 octets), duration/ID (2 octets) and three address fields (18 octets) of a beacon frame. A typical 802.11 beacon frame also includes a timestamp (8 octets), Service Set Identifier (SSID) (2-34 octets), Supported rates (3 octets), TIM (6-256 octets), Country (8-256 octets), Power Constraint (3 octets), Supported Channels (4-256 octets), Extended Rates (3-257 octets) and extended Capabilities (3-257 octets). A minimum ratio of power to process less than the entire beacon frame as just described, as opposed to an 802.11 beacon frame, is 22/(22+44) or 1/3. Even greater power savings can be achieved by just receiving and processing the PLCP Header 404 or just the rate 204 and reserved bit 210 fields of the PLCP header. By using a predefined null beacon frame as described herein (e.g. null beacon frame 300 in FIG. 3), the minimum ratio of power to process the null beacon frame as opposed to an entire 802.11 beacon frame is 26 (frame control 302—2 octets, duration/ID 304—2 octets, SA 306, DA 308 and BSSID 310—18 octets and FCS 312—4 octets) octets divided by 66 octets, or 26/66 which means processor 106 would stop processing and switch to a power save state in less than one-half the time it would take to receive and process an entire 802.11 compatible beacon frame.

In an example embodiment, apparatus 100 can be used by an access point for sending frames for speculative power savings as described herein. For example, power save logic 108 can signal processor 106 whether there are delivery traffic indications for broadcast, multicast and/or unicast frames for any associated mobile nodes registered as power save nodes. If there are no multicast and/or unicast frames for any associated mobiles registered as power save nodes, processor 106 can set a bit (e.g. reserved bit 210 in FIG. 2) or a group of reserved bits (e.g. the reserved bits in the signal field 422 of FIG. 4). Alternatively, or optionally, processor 106 can include a null beacon frame 300 as described herein. This allows any power save nodes capable of decoding frames as described herein to enter into a power save state quick than if they had to receive and process the entire frame.

Figure 5:
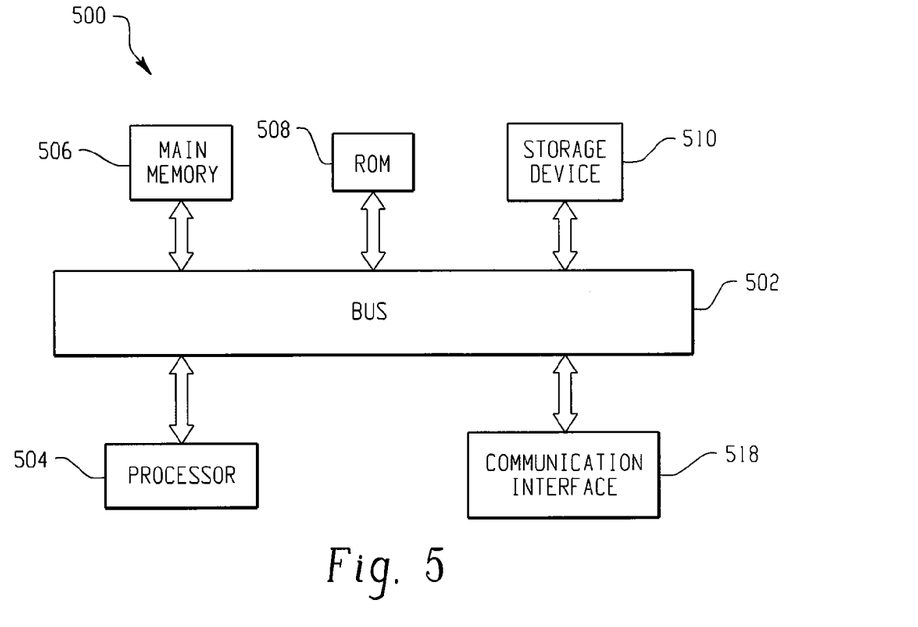
FIG. 5 illustrates an example computer system for implementing an example embodiment.

FIG. 5 is a block diagram that illustrates a computer system 500 upon which an embodiment of the invention may be implemented. For example computer system 500 can be used to implement processor 106 (FIG. 1) and/or power save logic 108 (FIG. 1). In an example embodiment, computer system 500 can be employed to implement both processor 106 and power save logic 108. Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

An aspect of the invention is related to the use of computer system 500 for implementing speculative power saving. According to one embodiment of the invention, speculative power saving is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multiprocessing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to non-volatile media, volatile media, and transmission media. Non-volatile media include for example optical or magnetic disks, such as storage device 510. Volatile media include dynamic memory such as main memory 506. Transmission media include coaxial cables, copper wire and fiber optics, including the wires that comprise bus 502. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Various forms of computer-readable media may be involved in carrying one or more sequences of one or more instructions to processor 504 for execution. For example, the instructions may initially be borne on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506 from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides data communication. For example, if using computer system 500 for implementing processor 106, communication interface 518 can be employed to couple processor 106 to wireless transceiver 102. As another example, if using computer system 500 for implementing processor 106, communication interface 518 can be employed to couple processor 106 to power save logic 108.

Figure 6:
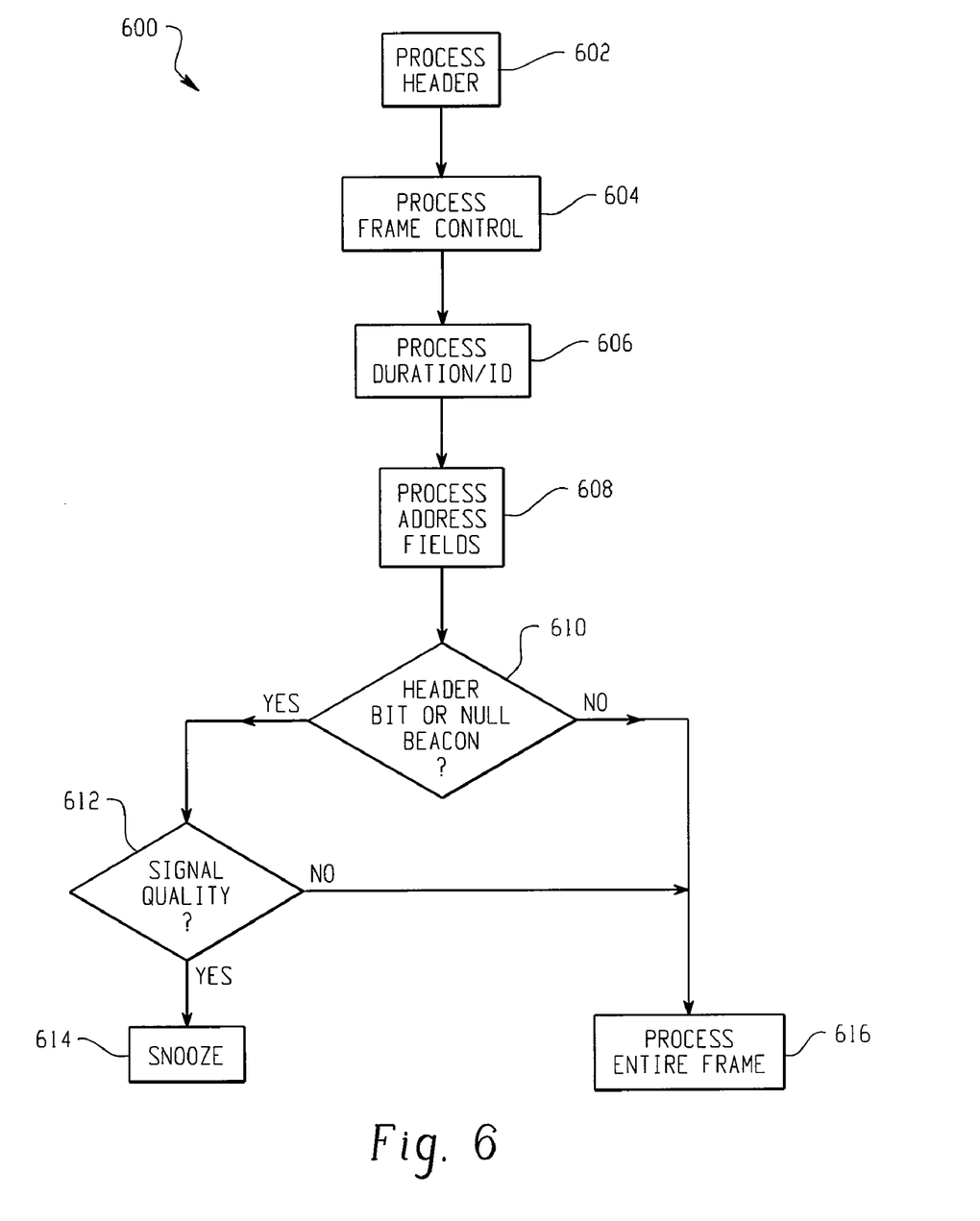
FIG. 6 illustrates a methodology of an example embodiment.

In view of the foregoing structural and functional features described above, a methodology 600 in accordance with various aspects of the present invention will be better appreciated with reference to FIG. 6. While, for purposes of simplicity of explanation, the methodology 600 of FIG. 6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement methodology 600 in hardware, software, or a combination thereof.

Methodology 600 is directed to the receiving and processing of a signal (e.g. a PPD with a frame), such as a beacon frame for performing speculative power savings. At 602, the header of the PPDU is processed. For example, if the frame is an 802.11 aggregate, the PLCP header is processed. In an example embodiment the PLCP header is processed by a PHY processor. At 604, a frame control field is processed. At 606, the duration/ID field of a frame is processed and at 608, address fields of the frame are processed. In an example embodiment, steps 604, 606, 608 are processed by a MAC processor, in another example embodiment steps 604, 606, 608 are processed by a PHY processor.

At 610, a determination is made whether the frame has a predefined bit set in the header and/or whether the frame is a beacon frame such as a null beacon frame. For example, in an example embodiment, only the PPDU header (e.g. a PLCP header) is processed to determine whether a predefined (e.g. reserved) bit, or plurality of bits are set that indicate the frame is a beacon with no delivery traffic indication for power save clients. In an example embodiment, the parity bit in the frame header is also processed and used to verify the header. In an example embodiment, the header is processed and a frame control field is processed to determine whether the frame is a beacon frame. The process duration/ID field and/or address fields may also be used in determining if the frame is a beacon frame with no delivery traffic indication for power save clients. In an example embodiment, a determination is made whether the signal (frame) contains a predefined Null Beacon Frame. The null beacon frame can be a predefined frame of shorter duration than a typical beacon frame, such as the null beacon frame described in FIG. 3.

If at 610 it is determined that the signal is for a PPDU and/or frame that does not have any delivery traffic indication for the receiver (YES) then receiving and processing of the frame can be halted without receiving and processing the entire frame. At 612, a signal quality parameter can be checked to further aid in determining whether the frame was received correctly. For example, Received Signal Strength Intensity (RSSI), Bit Error Rate (BER) and/or Packet Error Rate (PER) can be employed to determine signal quality. If the signal quality is determined to be sufficient, for example the RSSI is above a desired threshold or the BER and/or PER are below a desired threshold, (YES) then at 614 the receiver can switch to a snooze state, even if the entire frame has not yet been received and processed. If at 612 it is determined that the signal quality is poor (NO), then as shown at 616 the receiver does not enter a power save state but instead processes the entire frame.

If at 610, it is determined that the header of the frame does not have a predefined bit set or no predefined beacon frame was detected (NO), the entire frame is processed as illustrated at 616. In an example embodiment, the entire frame may also be processed based on the number of null beacon or speculative power save frames received. For example, the entire frame can be processed for every third speculative power save or null beacon frame.

What has been described above includes example implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A method, comprising:
   receiving a beginning portion of a signal;
   processing a header in the beginning portion of the signal;
   determining whether a bit in the header is set to a predetermined logic state indicating there are no delivery traffic indications for buffered frames contained within the frame;
   determining a signal quality parameter selected from a group consisting of packet error rate and bit error rate;
   determining whether the signal was received correctly based on the selected signal quality parameter;
   halting receiving and processing of the entire frame responsive to determining the bit is set to the predetermined logic state indicating there are no delivery traffic indications for buffered frames contained within the frame; and
   switching to a power save state responsive to determining the signal was received correctly based on the selected signal quality parameter.

2. The method according to claim 1, further comprising:
   the header comprises one of a group consisting of a parity bit and a checksum; and
   verifying the validity of the header using the one of a group consisting of a parity bit and a checksum;
   wherein the receiving and processing of less than the entire frame and switching to a power save state are responsive to determining the bit is set and the validity of the header is verified with the one of a group consisting of a parity bit and a checksum.

3. The method according to claim 1, further comprising receiving and processing a frame control field, duration field and an address field of a frame within the signal, wherein the halting of receiving and processing and the switching to a power save state are responsive to determining the bit is set, the frame control field contains data indicating the frame is a beacon frame and the address is directed to an appropriate multicast group.

4. The method according to claim 3, further comprising determining whether the frame control field contains a predefined special value.

5. The method according to claim 4, wherein the predefined special value is selected from a group consisting of 0x1110 and 0x1111.

6. The method according to claim 3, further comprising determining from the frame control fields that the frame is a beacon frame and wherein halting receiving and processing and switching to a power save state are responsive to the bit is set and determining that the frame is a beacon frame.

7. The method according to claim 6, the beacon frame comprises a traffic indication map, wherein the traffic indication map is set to zero.

8. The method according to claim 3, wherein the address field comprises a source address, a destination address, and a basic service set identifier the method further comprises verifying the source address, the destination address and the basic service set identifier.

9. A method according to claim 1 wherein the header is a physical layer convergence protocol header.

10. The method of claim 1, further comprising:
    receiving a beginning portion of a second signal;
    processing a header in the beginning portion of the second signal;
    determining whether a bit in the header of the second signal is set to a predetermined logic state indicating there are no delivery traffic indications for buffered frames contained within the frame;
    determining a second signal quality parameter selected from a group consisting of packet error rate and bit error rate for the second signal;
    determining whether the second signal was received correctly based on the selected second signal quality parameter; and
    continuing to process the second signal upon determining the bit in the header of the second signal is set to the predetermined logic state responsive to determining the signal was not received correctly based on the selected second signal quality parameter.

11. A method, comprising:
    receiving a frame;
    determining whether the frame contains a predefined null beacon frame;
    determining a signal quality parameter selected from a group consisting of packet error rate and bit error rate;
    determining whether the frame was received correctly based on the selected signal quality parameter; and
    switching to a power save state without processing the remainder of the frame responsive to both: i) determining the frame contains the predefined null beacon frame and ii) determining the frame was received correctly based on the signal quality parameter.

12. The method according to claim 11, wherein the predefined null beacon frame consists of a frame control field, a duration field, a source address field, a destination address field, a basic service set identifier field, and a frame check sequence field.

13. The method according to claim 12, wherein the frame control field is two octets in size, the duration field is two octets in size, the source address field is six octets in size, the destination address field is six octets in size, the basic service set identifier is six octets in size and the frame check sequence field is four octets in size.

14. The method according to claim 12, further comprising verifying the frame check sequence corresponds to the predefined null beacon frame, wherein the switching to a power save state is responsive to determining the frame contains the predetermined null beacon frame and the frame check sequence corresponds to the predefined null beacon frame.

15. An apparatus, comprising:
a wireless transceiver;
a processor coupled to the wireless transceiver and operable to process a frame received by the wireless transceiver; and
power save logic coupled to the processor;
wherein the processor is operable to process a header of the frame received by the wireless transceiver to determine whether a predefined bit in the header is set indicating there are no delivery traffic indications for buffered multicast frames contained within the frame;
wherein the processor is operable to determine a signal quality parameter selected from a group consisting of packet error rate and bit error rate;
wherein the processor is operable to determine whether the signal was received correctly based on the selected signal quality parameter; and
wherein the processor is responsive to halting receiving and processing of the frame and to signal the power save logic to switch to a power save state responsive to determining the predefined bit is set, to signal the power save logic to switch to a power save, and the signal was received correctly based on the selected signal quality parameter.

16. The apparatus according to claim 15, further comprising:
the header comprises one of a group consisting of a parity bit and a checksum; and
wherein the processor is configured to verifying the validity of the header using the one of a group consisting of a parity bit and a checksum; and
wherein the processor is responsive to halting receiving and processing of the frame and to signal the power save logic to switch to a power save state responsive to determining the predefined bit is set and the validity of the header is verified with the one of a group consisting of a parity bit and a checksum.

17. The apparatus according to claim 15, further comprising
the processor is configured to process a frame control field, duration field and an address field within the frame; and
wherein the processor is responsive to halting receiving and processing the frame and to signal the power save logic to switch to a power save state responsive to determining the predefined bit is set, the frame control field contains data indicating the frame is a beacon frame and the address is directed to an appropriate multicast group.

18. An apparatus, comprising:
a wireless transceiver;
a processor coupled to the wireless transceiver and operable to process a frame received by the wireless transceiver; and
power save logic coupled to the processor;
wherein the processor is operable to process the frame to determine whether the frame contains a predefined null beacon frame;
wherein the processor is operable to determine a signal quality parameter selected from a group consisting of packet error rate and bit error rate;
wherein the processor is operable to determine whether the signal was received correctly based on the selected signal quality parameter; and
wherein the processor is operable to signal the power save logic to switch to a power save state and halt processing the remainder of the frame responsive to: i) the determining the frame contains the predefined null beacon frame and ii) the determining the signal was received correctly based on the signal quality parameter.

19. The apparatus according to claim 18, wherein the null beacon frame comprises a frame control sequence, further comprising the processor is operable to verify the frame control sequence corresponds to the predefined null beacon frame, wherein the switching to a power save state is responsive to determining the frame contains the predetermined null beacon frame and the frame control sequence corresponds to the predefined null beacon frame.

* * * * *